(12) United States Patent
Shakoori

(10) Patent No.: US 12,134,051 B1
(45) Date of Patent: Nov. 5, 2024

(54) CONTAMINATED WATER PURIFICATION SYSTEM

(71) Applicant: Saeed Shakoori, Apollo Beach, FL (US)

(72) Inventor: Saeed Shakoori, Apollo Beach, FL (US)

( * ) Notice: Subject to any disclaimer, the term of this patent is extended or adjusted under 35 U.S.C. 154(b) by 60 days.

(21) Appl. No.: 18/091,090

(22) Filed: Dec. 29, 2022

Related U.S. Application Data

(60) Provisional application No. 63/297,978, filed on Jan. 10, 2022.

(51) Int. Cl.
  *B01D 3/10* (2006.01)
  *B01D 5/00* (2006.01)
  *C02F 1/04* (2023.01)

(52) U.S. Cl.
  CPC ........... *B01D 3/106* (2013.01); *B01D 5/0006* (2013.01); *B01D 5/0027* (2013.01); *B01D 5/006* (2013.01); *C02F 1/048* (2013.01)

(58) Field of Classification Search
  CPC .... B01D 3/106; B01D 5/0006; B01D 5/0027; B01D 5/006; C02F 1/048
  See application file for complete search history.

(56) References Cited

U.S. PATENT DOCUMENTS

| | | | | |
|---|---|---|---|---|
| 2,396,032 A | * | 3/1946 | Waterman | F22B 35/06 122/451 S |
| 2,560,226 A | | 7/1951 | Joos et al. | |
| 3,359,182 A | * | 12/1967 | Williamson | B01D 5/0006 202/205 |
| 4,353,874 A | | 10/1982 | Keller et al. | |
| 4,390,396 A | * | 6/1983 | Koblenzer | B01D 3/001 202/170 |
| 4,882,012 A | * | 11/1989 | Wasserman | B01D 5/0066 202/195 |
| 4,957,624 A | | 9/1990 | Peranio | |
| 4,985,122 A | * | 1/1991 | Spencer | B01D 3/00 202/202 |
| 5,132,090 A | | 7/1992 | Volland | |
| 5,346,592 A | * | 9/1994 | Madani | B01D 1/26 203/88 |
| 5,348,623 A | * | 9/1994 | Salmon | B01D 5/006 203/1 |

(Continued)

*Primary Examiner* — Jonathan Miller
(74) *Attorney, Agent, or Firm* — John Rizvi; John Rizvi, P.A.—The Patent Professor®

(57) ABSTRACT

A contaminated water purification system includes a contaminated water storage tank and a contaminated water inlet manifold to transfer contaminated water to a reactor unit having a heater unit mounted therein. The heater unit is disposed and configured to contact the contaminated water in the reactor unit and convert an aqueous component of the contaminated water into purified steam. A purified steam discharge manifold is disposed between the reactor unit and a steam conversion chamber to transfer the purified steam to the steam conversion chamber which condenses the purified steam into purified water, while the contaminant component or components remain in the reactor unit. A purified water storage assembly includes a purified water storage tank to at least temporarily hold the purified water condensed from the purified steam in the steam conversion chamber.

20 Claims, 8 Drawing Sheets

(56) References Cited

U.S. PATENT DOCUMENTS

| | | | | |
|---|---|---|---|---|
| 5,951,825 | A * | 9/1999 | Land | B01D 5/0006 |
| | | | | 202/83 |
| 5,968,321 | A * | 10/1999 | Sears | B01D 3/42 |
| | | | | 203/1 |
| 6,010,599 | A * | 1/2000 | Wang | B01D 3/007 |
| | | | | 202/205 |
| 7,578,345 | B2 * | 8/2009 | Minnich | B01D 5/006 |
| | | | | 166/371 |
| 7,842,121 | B2 * | 11/2010 | Sanderson | B01D 1/16 |
| | | | | 95/169 |
| 8,585,869 | B1 | 11/2013 | Dusel, Jr. | |
| 8,882,968 | B1 * | 11/2014 | Griggs | B01D 1/0035 |
| | | | | 203/10 |
| 9,102,545 | B2 | 8/2015 | Riley et al. | |
| 9,199,861 | B2 | 12/2015 | Dusel, Jr. et al. | |
| 9,834,455 | B2 * | 12/2017 | Frolov | B01D 3/007 |
| 10,092,851 | B2 | 10/2018 | Dighe | |
| 10,472,259 | B2 * | 11/2019 | Berns | B01L 3/02 |
| 11,034,605 | B2 * | 6/2021 | Katz | B01D 61/149 |
| 11,097,203 | B1 * | 8/2021 | Aguinaldo | B01D 3/105 |
| 2008/0164135 | A1 * | 7/2008 | Slook | C02F 1/18 |
| | | | | 202/83 |
| 2011/0108471 | A1 | 5/2011 | Page et al. | |
| 2012/0273367 | A1 | 11/2012 | Themy et al. | |
| 2012/0292176 | A1 | 11/2012 | Machhammer et al. | |
| 2019/0300410 | A1 * | 10/2019 | Katz | B01D 3/007 |
| 2021/0283525 | A1 * | 9/2021 | Aguinaldo | B01D 1/2853 |

* cited by examiner

CONTAMINATED WATER PURIFICATION SYSTEM

CROSS-REFERENCE TO RELATED APPLICATIONS

This application claims the benefit of U.S. Patent Application Ser. No. 63/297,978 filed on Jan. 10, 2022, which is incorporated by reference herein in its entirety.

FIELD OF THE INVENTION

The present invention relates generally to a contaminated water purification system to purify an amount of contaminated water having an aqueous component and one or more contaminant components.

BACKGROUND OF THE INVENTION

From an early age we are taught that over 70% of the Earth's surface is covered in water. We also learn that, coincidentally, the human body is made up of about 70% water. We turn on a tap, and water, seemingly, freely flows. It is a fact that up until the later part of the last century, with some notable exceptions, water has been treated as an endless resource with little to no attention paid to how to conserve and/or retreat and reuse this most precious of natural resources. Like the air we breathe, life on Earth needs clean fresh water to survive. From each baby's first sip of water to the vast agricultural expanses of the Midwest across America's Breadbasket, clean fresh water is essential to sustaining life.

Despite mankind's reliance upon fresh water to survive, men have found seemingly countless ways to contaminate the very same, and increasingly limited, fresh water supplies. A few of the major sources of fresh water contamination are industrial waste, which has increased exponentially since the start of the industrial revolution, chemical production facilities and petrochemical refineries, electrical generating facilities, mining operations, agricultural runoff from livestock ranches and fertilizer/pesticide runoff from farmlands, domestic sewage treatment, urban runoff, and salt water instruction resulting from increasing dependency on shallow aquifers in coastal regions, just to name a few. The types of contaminants found in contaminated water include, among many other things, organic matter, pathogens and microbial contaminants, nutrients, salts, acids, heavy metals, toxic organic compounds, as well as silt and suspended particulate matter.

The wide array of contaminants found in contaminated water, and more specifically, contaminated fresh water, have spawned an almost equally wide array of treatment processes, many of which are highly dependent on the type and/or amount of contaminant or contaminants present in the contaminated water. In one instance, a treatment process may be primarily focused on concentrating and/or isolating one or more particularly hazardous and/or toxic contaminants, so as to reduce a risk of exposure to the same. Alternatively, a treatment process, in some cases, actually focusses on recovering a fresh water component of contaminated water for reuse or return to its source.

These treatment processes range from simple, static settling tanks or basins in which suspended particulate matter is allowed to drop out of solution via gravitational forces. Oftentimes, chemical flocculation agents are employed to facilitate the sedimentation process. Filter beds or filter cartridges are used in some treatment processes where the luxury of time to allow sedimentation to occur does not exist. Carbon filters are commonly employed to remove a number of organic constituents from contaminated water, thereby transferring the contaminants to a large volume of carbon, now containing the containments, which must then be disposed of or regenerated, either at considerable cost.

Various chemical treatments may be employed to neutralize water contaminated with salts, acids, or perhaps bases. Of course, the production of chemicals, itself a major source of contaminated water, to add to contaminated water to neutralize another chemical component is not just counterintuitive, but an inefficient solution to the ongoing problem of contaminated water generation.

Other contaminated water treatment processes include the introduction of concentrated bleach and/or hydrogen peroxide, sometimes in conjunction with expensive ultraviolet light sources, in order to destroy micro-organisms and other pathogens. Once again, chemical components are added to contaminated water in order to neutralize, treat or kill one or more contaminants present in the contaminated water.

It is not uncommon for two or more of the aforementioned treatment processes, as well as other treatment processes not described above, to be combined in any of a number of contaminant specific series-type configurations. The specific processes, their arrangement in the series configuration and their operating parameters are often developed based on expense and time consuming bench and/or pilot scale studies performed on a sample of the contaminated water to be treated.

Unfortunately, there is not a contaminated water treatment system available that can effectively and efficiently purify an amount of contaminated water regardless of the type and/or amount of contaminants present therein.

Accordingly, there is an established need for a solution to one or more of the aforementioned shortcomings in the current state of the art.

SUMMARY OF THE INVENTION

The present invention is directed generally to contaminated water purification system to purify an amount of contaminated water having an aqueous component and one or more contaminant components.

In a first implementation of the invention, a contaminated water purification system comprises: a contaminated water storage assembly having a contaminated water storage tank to at least temporarily contain the amount of contaminated water prior to purification; a purification assembly having a contaminated water inlet manifold and a purified steam discharge manifold; a reactor assembly comprising at least one reactor unit disposed in fluid communication with the contaminated water inlet manifold, a portion of the amount of contaminated water is transferred from the contaminated water storage tank to the at least one reactor unit through the contaminated water inlet manifold; a heater assembly having at least one heater unit mounted in the at least one reactor unit disposed and configured to contact the portion of the amount of contaminated water therein, the at least one heater unit converts at least some of the aqueous component of the amount of contaminated water into an amount of purified steam; a steam conversion assembly comprising a steam conversion chamber, the purified steam discharge manifold disposed in fluid communication between the at least one reactor unit and the steam conversion chamber to transfer the amount of purified steam to the steam conversion chamber which condenses the amount of purified steam into an amount of purified water while the at least one contaminant component remains in the at least one reactor unit; and, a purified water storage assembly having a purified water storage tank to hold the amount of purified water condensed from the amount of purified steam in the steam conversion chamber.

In a second aspect, the contaminated water purification system can include a reactor assembly having a plurality of reactor units.

In another aspect, the contaminated water purification system may have each of a plurality of reactor units disposed in fluid communication with a contaminated water inlet manifold to transfer a portion of the amount of contaminated water from a contaminated water storage tank to the plurality of reactor units.

In a further aspect, the contaminated water purification system can include a plurality of heater units each mounted in a different one of a plurality of reactors units and disposed and configured to contact a portion of an amount of contaminated water received therein, each of the plurality of heater units converts an aqueous component of the portion of the contaminated water into a corresponding amount of purified steam.

In one other aspect, the contaminated water purification system may have a purified steam discharge manifold disposed in fluid communication between each of a plurality of reactor units and a steam conversion chamber to transfer a corresponding amount of purified steam from each of the plurality of reactor units to the steam conversion chamber.

In yet another aspect, the contaminated water purification system can include a purification assembly having a vacuum pump.

In still one further aspect, the contaminated water purification system may have a purification assembly including a vacuum manifold disposed in evacuating communication between a vacuum pump and at least one reactor unit.

In yet one other aspect, the contaminated water purification system can include a vacuum pump which creates a vacuum pressure in at least one reactor unit of about 26 to about 29 inches of mercury below atmospheric pressure, thereby depressing a boiling point of an aqueous component of the contaminated water contained therein to about 120 degrees Fahrenheit to about 80 degrees Fahrenheit.

In still another aspect, the contaminated water purification system may have a purification assembly further includes a vacuum manifold disposed in evacuating communication between a vacuum pump and each of a plurality of reactor units.

In yet one further aspect, the contaminated water purification system can include a vacuum pump which creates a vacuum pressure in each of a reactor units of about 26 to about 29 inches of mercury below atmospheric pressure, thereby depressing a boiling point of an aqueous component of the contaminated water contained therein to about 120 degrees Fahrenheit to about 80 degrees Fahrenheit.

In still one other aspect, the contaminated water purification system may have a steam conversion assembly including a chiller unit disposed in communication with a steam conversion chamber, the chiller unit generates an amount of cooling fluid therein.

In yet another aspect, the contaminated water purification system can include a steam conversion chamber having at least one cooling coil disposed therein, the at least one cooling coil having a portion of the amount of cooling fluid from a chiller unit flowing therethrough, the amount of purified steam transferred to the steam conversion chamber contacts the at least one cooling coil and is condensed into the amount of purified water therein.

In still one further aspect, the contaminated water purification system may have a steam conversion chamber comprises a plurality of cooling coils disposed therein, each of the plurality of cooling coils having a portion of the amount of cooling fluid from a chiller unit flowing therethrough, the amount of purified steam transferred to the steam conversion chamber contacts at least one of the plurality of cooling coils and is condensed into the amount of purified water therein.

In yet one other aspect, the contaminated water purification system can include a steam conversion assembly further comprises a steam jet ejector disposed between a purified steam discharge manifold and a steam conversion chamber, the steam jet ejector mixes a portion of the amount of purified water from the steam conversion chamber with the amount of purified steam passing therethrough to expedite conversion of the amount of purified steam into the amount of purified water.

In another implementation of the invention, a contaminated water purification system comprises: a contaminated water storage assembly having a contaminated water storage tank to at least temporarily contain the amount of contaminated water prior to purification; a purification assembly having a contaminated water inlet manifold and a purified steam discharge manifold; a reactor assembly comprising a plurality of reactor units each disposed in fluid communication with the contaminated water inlet manifold, a portion of the amount of contaminated water is transferred from the contaminated water storage tank to each of the plurality of reactor units through the contaminated water inlet manifold; a heater assembly having a plurality of heater units each mounted in a different one of the plurality of reactor units and disposed and configured to contact the portion of the amount of contaminated water therein, each of the plurality of heater units converts at least some of the aqueous component of the corresponding amount of contaminated water into a corresponding amount of purified steam; the purification assembly further comprises a vacuum pump and a vacuum manifold disposed in evacuating communication between the vacuum pump and each of the plurality of reactor units; a steam conversion assembly comprising a steam conversion chamber, the purified steam discharge manifold disposed in fluid communication between each of the plurality of reactor units and the steam conversion chamber to transfer the amount of purified steam from each of the plurality of reactor units to the steam conversion chamber which condenses the amounts of purified steam into an amount of purified water while the at least one contaminant component remains in each of the plurality of reactor units; and a purified water storage assembly having a purified water storage tank to hold the amount of purified water condensed from the amounts of purified steam in the steam conversion chamber.

In another implementation of the invention, a contaminated water purification system comprises: a contaminated water storage assembly having a contaminated water storage tank to at least temporarily contain the amount of contaminated water prior to purification; a purification assembly having a contaminated water inlet manifold and a purified steam discharge manifold; a reactor assembly comprising a plurality of reactor units each disposed in fluid communication with the contaminated water inlet manifold, a portion of the amount of contaminated water is transferred from the contaminated water storage tank to each of the plurality of reactor units through the contaminated water inlet manifold; a heater assembly having a plurality of heater units each mounted in a different one of the plurality of reactor units and disposed and configured to contact the portion of the amount of contaminated water therein, each of the plurality of heater units converts at least some of the aqueous component of the corresponding amount of contaminated water into a corresponding amount of purified steam; the purification assembly further comprises a vacuum pump and a vacuum manifold disposed in evacuating communication between the vacuum pump and each of plurality of reactor units; a steam conversion assembly comprising a steam conversion chamber comprising a plurality of cooling coils disposed therein, each of the plurality of cooling coils having an amount of a cooling fluid from a chiller unit flowing therethrough: the purified steam discharge manifold disposed in fluid communication between each of the plurality of reactor units and the steam conversion chamber to transfer the amount of purified steam from each of the plurality of reactor units to the steam conversion chamber while the one or more contaminant components remain in each of the plurality of reactor units, the amounts of purified steam transferred to the steam conversion chamber contact at least one of the plurality of cooling coils condensing it into an amount of purified water therein; and a purified water storage assembly having a purified water storage tank to hold the amount of purified water condensed from the amounts of purified steam in the steam conversion chamber.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is generally directed towards a contaminated water purification system to purify an amount of contaminated water having an aqueous component and one or more contaminant components. It is noteworthy that the present invention has been developed to provide a single contaminated water purification system which is capable of purifying contaminated water despite, with few exceptions, the composition and/or concentration of contaminant(s) contained therein.

Figure 1:
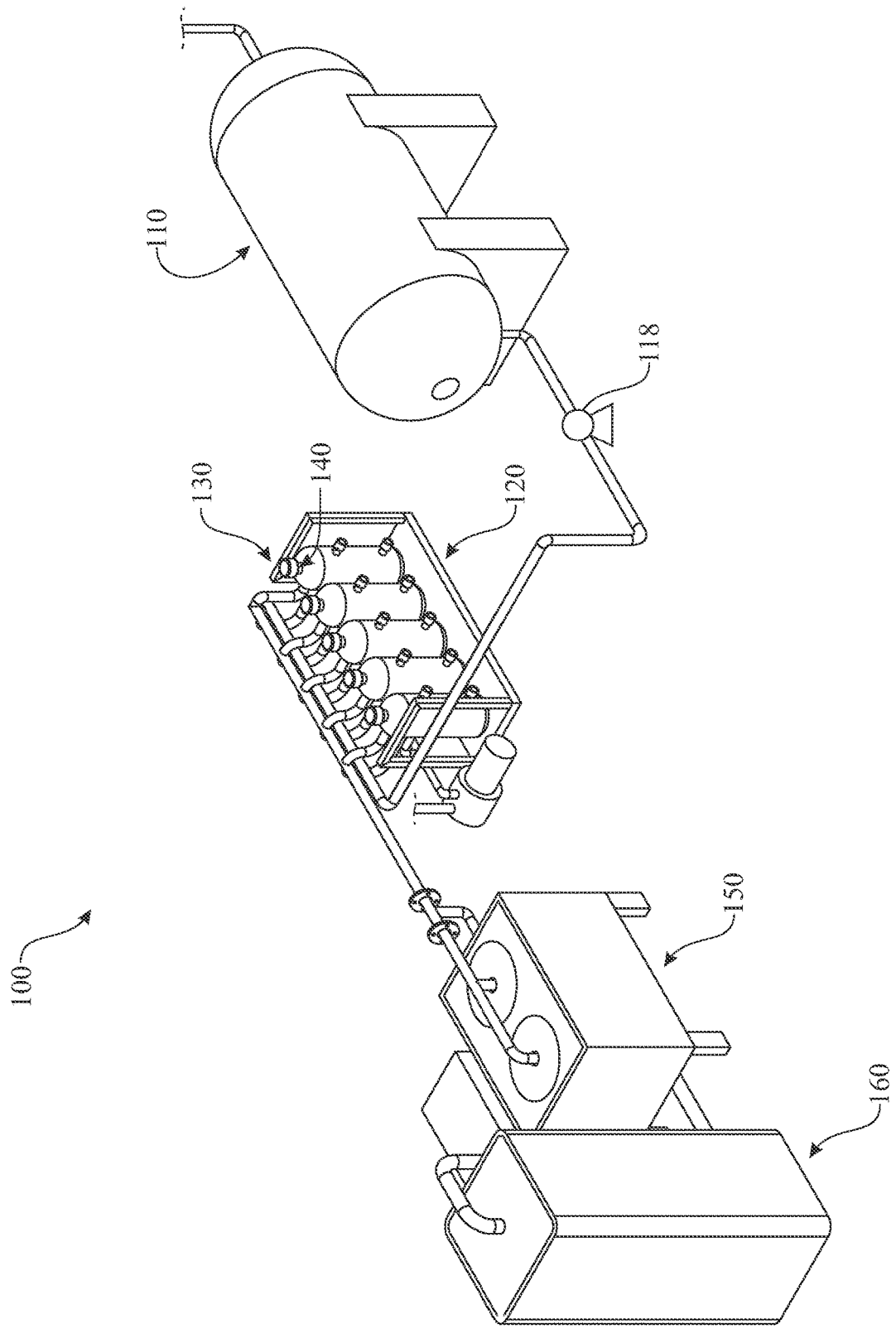
FIG. 1 presents a perspective view of one illustrative embodiment of a contaminated water purification system, in accordance with the present invention.

Referring initially to FIG. 1, presented therein is a perspective view of one illustrative embodiment of a contaminated water purification system 100, in accordance with the present invention. A contaminated water purification system 100 in at least one embodiment of the present invention includes at least one contaminated water storage assembly 110. As may be seen from FIG. 1, a contaminated water storage assembly 110 includes a contaminated water storage tank 112. In at least one embodiment, a contaminated water storage assembly 110 includes one or more tank support 113 on which a contaminated water storage tank 112 is operatively staged. A contaminated water storage tank 112 in accordance with the present invention is dimensioned and configured to at least temporarily contain an amount contaminated water, such as may be generated from a variety of sources including, but not limited to, industrial wastewater, chemical production and petrochemical refineries, mining operations, agricultural runoff from livestock ranches and fertilizer/pesticide runoff from farmlands, domestic sewage treatment, urban runoff, and salt water instruction resulting from increasing depending on shallow aquifers in coastal regions, just to name a few. More in particular, an amount of contaminated water which may be purified utilizing the present contaminated water purification system 100 includes a significant aqueous component, i.e., water, and one or more solid, liquid, or gaseous contaminants mixed and/or dissolved therein, such as those described hereinabove.

Figure 2:
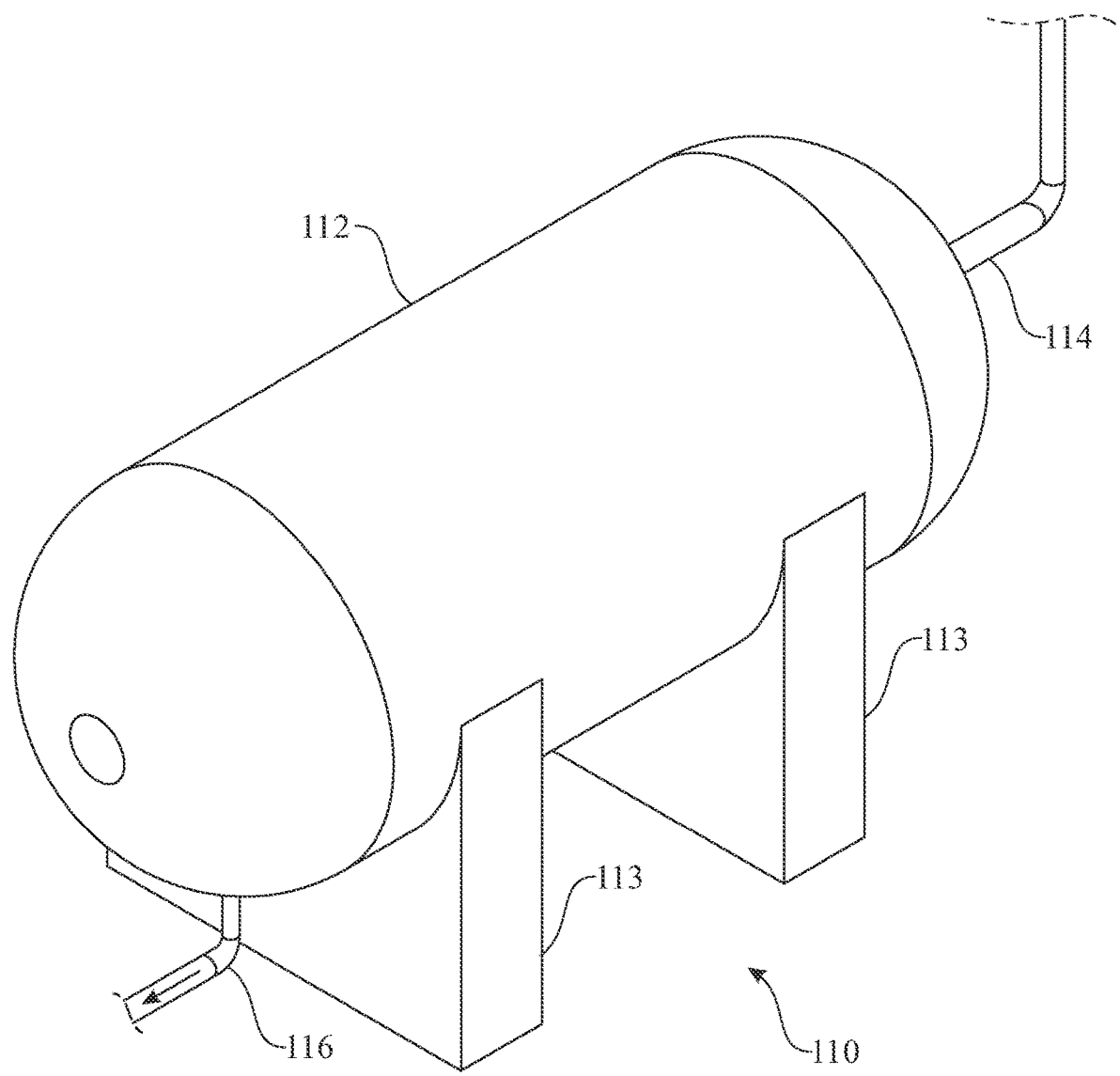
FIG. 2 presents a perspective view of one illustrative embodiment of a contaminated water storage assembly, in accordance with the present invention.

With reference to FIG. 2, a contaminated water storage tank 112 of a contaminated water storage assembly 110 further comprises a contaminated water inlet pipe 114 through which an amount of contaminated water is transferred into a contaminated water storage tank 112 from a contaminated water source and/or a temporary contaminated water storage facility. In one embodiment, contaminated water may be transferred to a contaminated water storage tank 112 through a contaminated water inlet pipe 114 via gravity, which is accomplished by staging the contaminated water storage tank 112 at a sufficient elevation below the source of the contaminated water. Alternatively, contaminated water may be pumped to a contaminated water storage tank 112 from the contaminated water source and/or temporary contaminated water storage facility through a contaminated water inlet pipe 114. A contaminated water storage assembly 100 further comprises a contaminated water discharge pipe 116 to transfer an amount of the contaminated water from the contaminated water storage tank 112 to the next stage in the present contaminated water purification system 100. In one embodiment, contaminated water may be transferred from a contaminated water storage tank 112 via gravity, once again, by staging the contaminated water storage tank 112 at a sufficient elevation above a purification assembly 120 of the present contaminated water purification system 100. Alternatively, a contaminated water transfer pump 118 is employed to transfer an amount of contaminated water from a contaminated water storage tank 112 to a purification assembly 120, such as is shown by way of example in the illustrative embodiment of a contaminated water purification system 100 in accordance with the present invention in FIG. 1.

A primary settling tank or pond may be employed to allow gross solid particulate matter to settle out of an amount of contaminated water, prior to transfer of the amount of contaminated water to the present contaminated water purification system 100. In such an embodiment, a contaminated water storage tank 112 is equipped with one or more clean out ports or hatches so as to permit periodic removal of settled solid particulate waste which has accumulated therein.

As will be appreciated, a contaminated water storage tank 112 and/or other components of a contaminated water storage assembly 110 may be constructed from any of a variety of materials exhibiting sufficient strength and rigidity to support the weight of the amount of contaminated water to be stored in and/or transferred therethrough. It will be further appreciated that depending on the composition and amount of contaminant(s) contained in the contaminated water to be purified in the present contaminated water purification system 100, a contaminated water storage tank 112 and/or other components of a contaminated water storage assembly 110 may be constructed from any of a number of materials which are non-reactive and/or resistant to attack from a majority of contaminants likely to be found in an amount of contaminated water. For example, in one embodiment, a contaminated water storage tank 112 and/or other components of a contaminated water storage assembly 110 may be constructed from stainless steel, or carbon steel lined with glass or another substantially inert material. In at least one other embodiment, a contaminated water storage tank 112 and/or other components of a contaminated water storage assembly 110 may be constructed from any of a number of other materials including, but in no manner limited to, plastic, fiberglass, engineered composite materials, etc., just to name a few.

Figure 3:
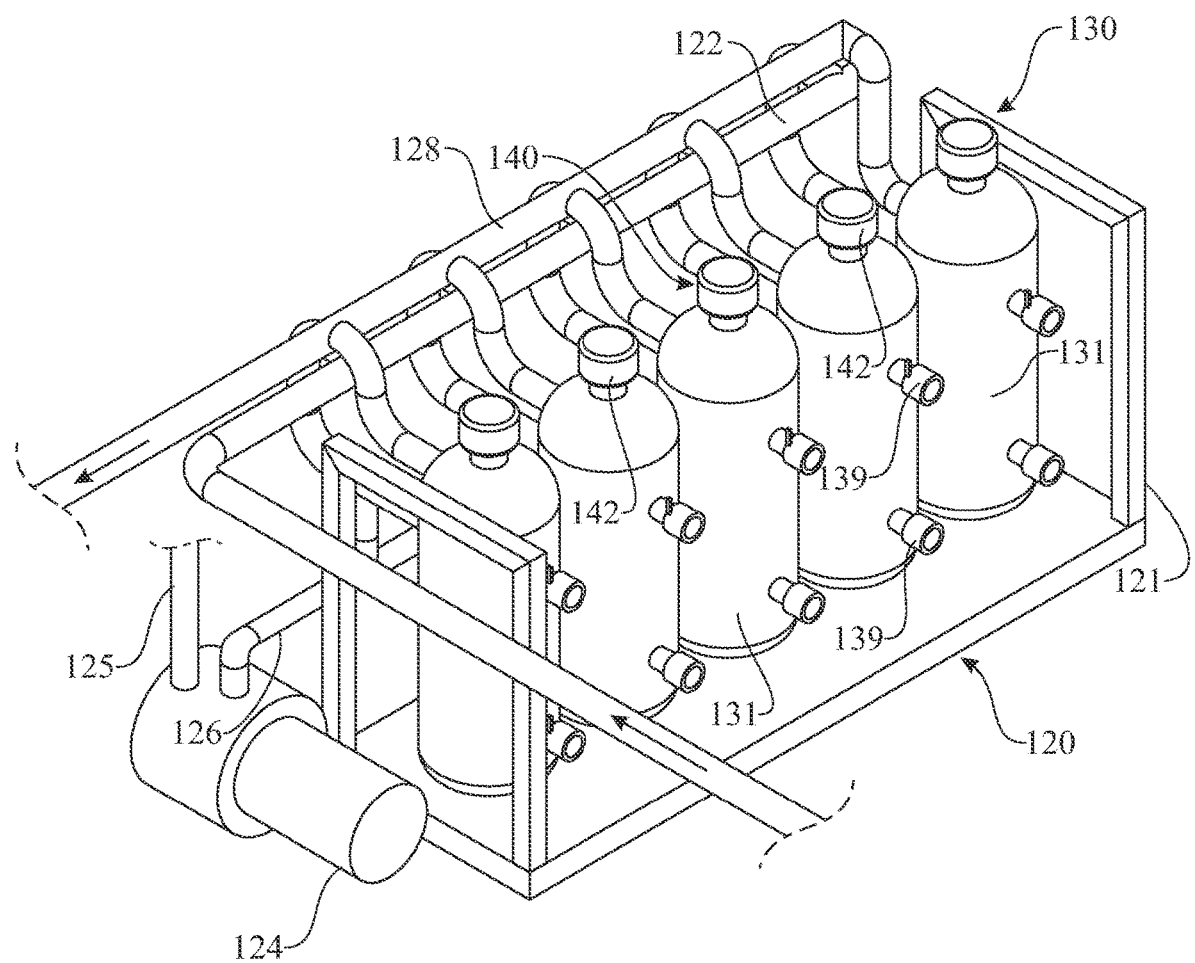
FIG. 3 presents a top front perspective view of one illustrative embodiment of a purification assembly and a reactor assembly, in accordance with the present invention.
Figure 4:
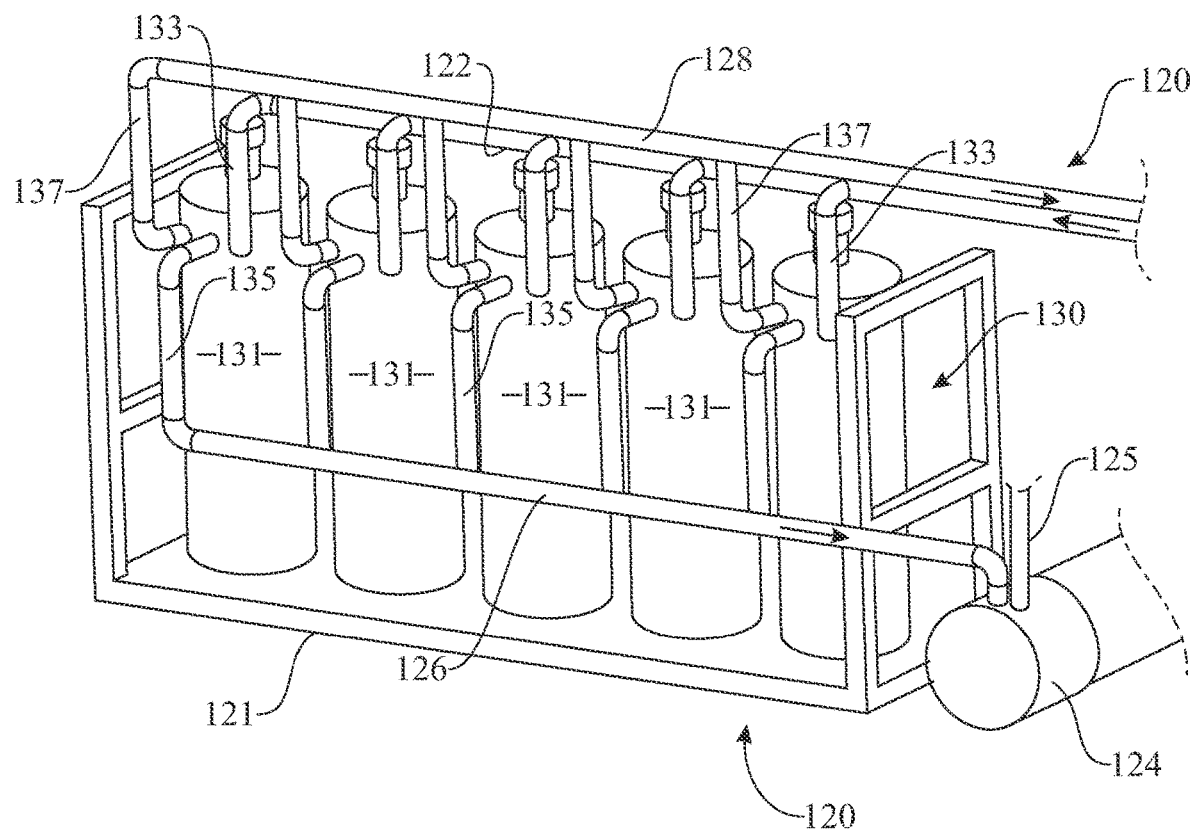
FIG. 4 presents a top rear perspective view of the purification assembly and the reactor assembly of FIG. 3, in accordance with the present invention.

As described above, a contaminated water purification system 100 in accordance with at least one embodiment of the present invention further includes a purification assembly 120. A purification assembly 120 in at least one embodiment includes a contaminated water inlet manifold 122 which receives an amount of contaminated water from a contaminated water storage tank 112 for distribution therethrough to a reactor assembly 130. A purification assembly 120 in at least one other embodiment includes a steam discharge outlet manifold 128 which receives an amount of purified steam from a reactor assembly 130. In at least one further embodiment, the purification assembly 120 includes a reactor support frame 121 on which one or more reactor units 131 of a reactor assembly 130 are operatively staged, such as is shown best in the illustrative embodiments of FIGS. 3 and 4.

A purification assembly 120 in accordance with at least one embodiment of the present invention also includes at least one vacuum pump 124. A vacuum pump 124 is provided to reduce a pressure in one or more reactor units 131 of a reactor assembly 130 to facilitate generating an amount of purified steam from the contaminated water processed therein, as is discussed in greater detail hereinafter. More in particular, a vacuum pump 124 in one embodiment is capable of reducing the pressure in the head space of a reactor unit 131 from about 5 inches of mercury to about 29 inches of mercury below atmospheric pressure. In at least one other embodiment, a vacuum ump 124 is capable of reducing the pressure in the head space of a reactor unit 131 from about 15 inches of mercury to about 29 inches of mercury below atmospheric pressure. In still one further embodiment, a vacuum pump 124 is capable of reducing the pressure in the head space of a reactor unit 131 from about 26 inches of mercury to about 29 inches of mercury below atmospheric pressure, The result of the reduction in pressure in the headspace of a reactor unit 131 is a depression in the boiling point of pure water to about 120 degrees Fahrenheit at about 26 inches of mercury to about 80 degrees Fahrenheit at about 29 inches of mercury below atmospheric pressure. Of course, it will be appreciated that the composition and amount of contaminant(s) present in the aqueous component. i.e., the water component, of the contaminated water can significantly alter the actual boiling point of the contaminated water at any given vacuum pressure.

A vacuum pump 124 in at least one embodiment includes a vacuum pump exhaust 125 through which the vapors evacuated from a headspace of the one or more reactor units 131 of a reactor assembly 130 in accordance with the present invention are discharged. Depending on the composition and amount of contaminant(s) contained the contaminated water to be purified with the present contaminated water purification system 100, the vapors discharged through a vacuum pump exhaust 125 may be routed through a vapor treatment system (not shown) prior to discharge.

As before, and also depending on the composition and amount of contaminant(s) contained in the contaminated water to be purified in the present contaminated water purification system 100, a vacuum pump 124 and/or other components of a purification assembly 120 may be constructed from any of a number of materials which are resistant to attack from a majority of common contaminants found in contaminated water such as, one again, by way of example only, lined carbon steel, stainless steel, plastic, fiberglass, engineered composite materials, etc., just to name a few.

A contaminated water purification system 100 in accordance with the present invention further comprises a reactor assembly 130, such as is shown by way of example in the illustrative embodiment of FIG. 1. A reactor assembly 130 includes at least one reactor unit 131 in which an amount of purified steam is separated from an amount of contaminated water as is described in greater detail hereinafter. Looking once again to FIGS. 3 and 4, a reactor assembly 130 in accordance with at least one embodiment of the present invention comprises a plurality of reactor units 131. As further shown in the illustrative embodiment of FIGS. 3 and 4, each of the plurality of reactor units 131 is operatively staged on the reactor support frame 121 of the purification assembly 120.

Figure 5:
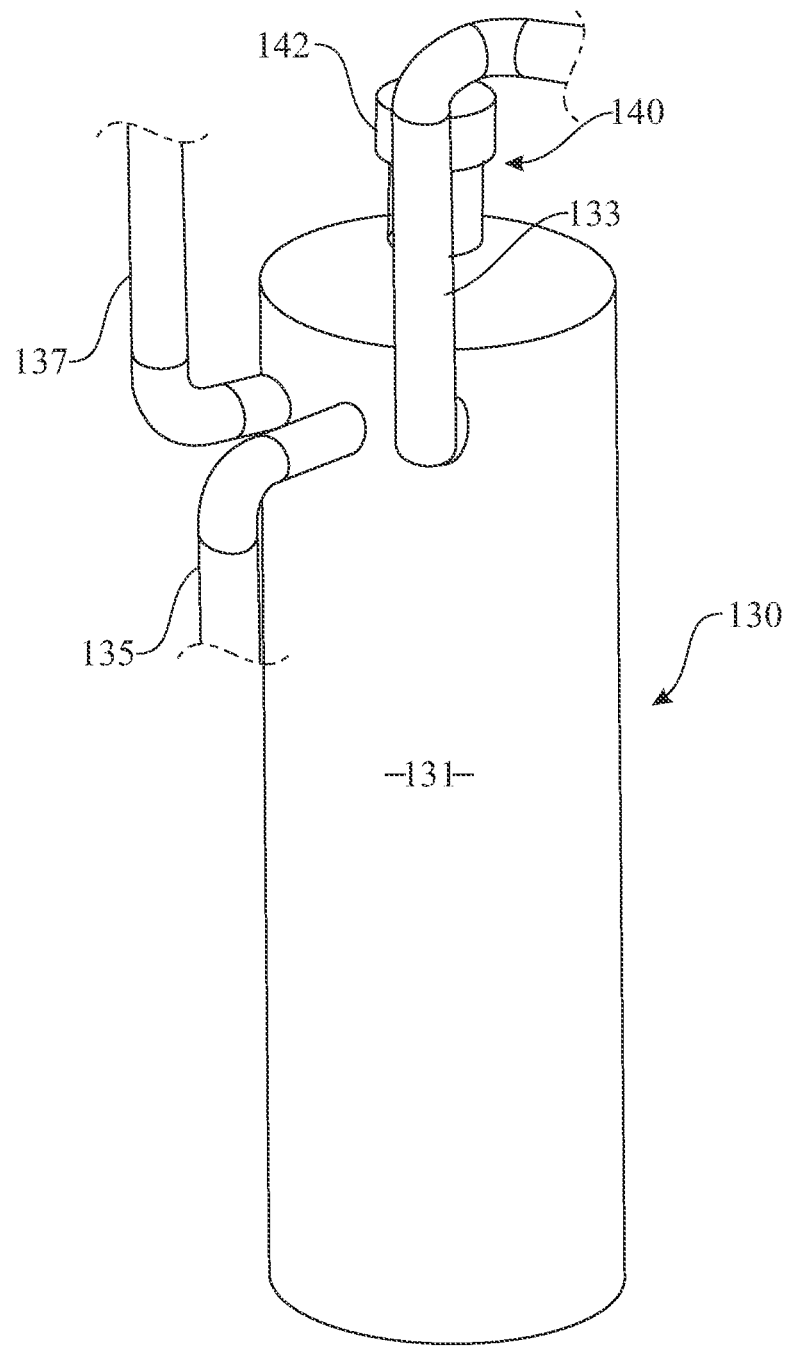
FIG. 5 presents a perspective view of one illustrative embodiment of a reactor unit having a heater unit mounted therein, in accordance with the present invention.

A reactor unit 131 in accordance with the present invention includes a contaminated water inlet 133, such as is shown in FIG. 5. In one embodiment, a contaminated water inlet 133 is disposed in fluid communication with a contaminated water inlet manifold 122 of a purification assembly 120. More in particular, a contaminated water inlet manifold 122 is disposed in fluid communication between a contaminated water storage tank 112 and a contaminated water inlet 133 of each of the plurality of reactor units 131, such as is shown best in the illustrative embodiment of FIG. 4. A reactor unit 131 in accordance with the present invention also includes a vacuum line 135, as is also shown in FIG. 5. In one embodiment, a vacuum line 135 is disposed in fluid communication with a vacuum manifold 126 of a purification assembly 120. A vacuum manifold 126 is disposed in fluid communication between a vacuum pump 124, as disclosed above, and a vacuum line 135 of each of the plurality of reactor units 131, once again, as is best seen in the illustrative embodiment of FIG. 4, in order to create a negative pressure in the headspace of each reactor unit 131 during operation. A reactor unit 131 in accordance with the present invention also includes a steam discharge outlet 137, such as is also shown in FIG. 5. In one embodiment, a steam discharge outlet 137 of each of a plurality of reactor units 131 is disposed in fluid communication with a steam discharge outlet manifold 128 of a purification assembly 120. A steam discharge outlet manifold 128 is disposed in fluid communication between a steam discharge outlet 137 of each of the plurality of reactor units 131, such as is shown best, once again, in the illustrative embodiment of FIG. 4, and a steam conversion assembly 150, as described further hereinafter.

As before, and once again, depending on the composition and amount of contaminant(s) contained in the contaminated water to be purified in the present contaminated water purification system 100, a reactor unit 131, a contaminated water inlet 133, a vacuum line 135, a steam discharge outlet 137 and/or other components of a reactor assembly 130 may be constructed from any of a number of materials which are resistant to attack from a majority of common contaminants found in contaminated water such as, one again, by way of example only, lined carbon steel, stainless steel, plastic, fiberglass, engineered composite materials, etc., just to name a few.

A contaminated water purification system 100 in accordance with the present invention further comprises a heater assembly 140, such as is shown in the illustrative embodiment of FIG. 1. A heater assembly 140 includes at least one heater unit 142 which is operably mounted in at least one reactor unit 131 of a reactor assembly 130. With reference once again to FIG. 3, in at least one embodiment, a heater assembly 140 in accordance with the present invention comprises a plurality of heater units 142 each operably mounted in a different one of the plurality of reactor units 131 of a reactor assembly 130.

A heater unit 142 in accordance with the present invention is dimensioned and configured to raise the temperature of an amount of contaminated water being processed in a reactor unit 131 to at least the boiling point of an aqueous component, i.e., once again, the water component, in the contaminated water, thereby generating an amount of purified steam. As used herein, "purified steam" shall mean steam that is essentially free of the contaminant component(s) present in an amount of contaminated water being treated in a reactor unit 131. i.e., only trace amounts of contaminant component(s), in accordance with the present invention. A heater unit 142 in accordance with the present invention further comprises a power head 144 which controls an amount of heat generated by the heater unit 142 and transferred to an amount of contaminated water in a reactor unit 131 in order to bring the aqueous component therein to its boiling point or above. As disclosed hereinabove, the boiling point, i.e., the temperature at which an aqueous component of an amount of contaminated water will change for a liquid state to a gaseous state, is highly dependent on the pressure, or lack thereof, in a reactor unit 131 such as is created by a vacuum pump 124 disposed in evacuating communication therewith. As also disclosed above, the boiling point of an amount of contaminated water will also be dependent on the composition and amount of contaminant(s) contained in the contaminated water. It will be appreciated that the operational parameters of both a vacuum pump 124 and a heater unit 142 in accordance with the present invention are integral with one another to assure purified steam is generated in a reactor unit 131 from an amount of contaminated being processed therein. As such, a control system is provided in at least one embodiment to regulate the operation of a vacuum pump 124 and/or a heater unit 142 for each reactor unit 131 in order to optimize the generation of purified steam therefrom, as is discussed in further detail below.

Figure 6:
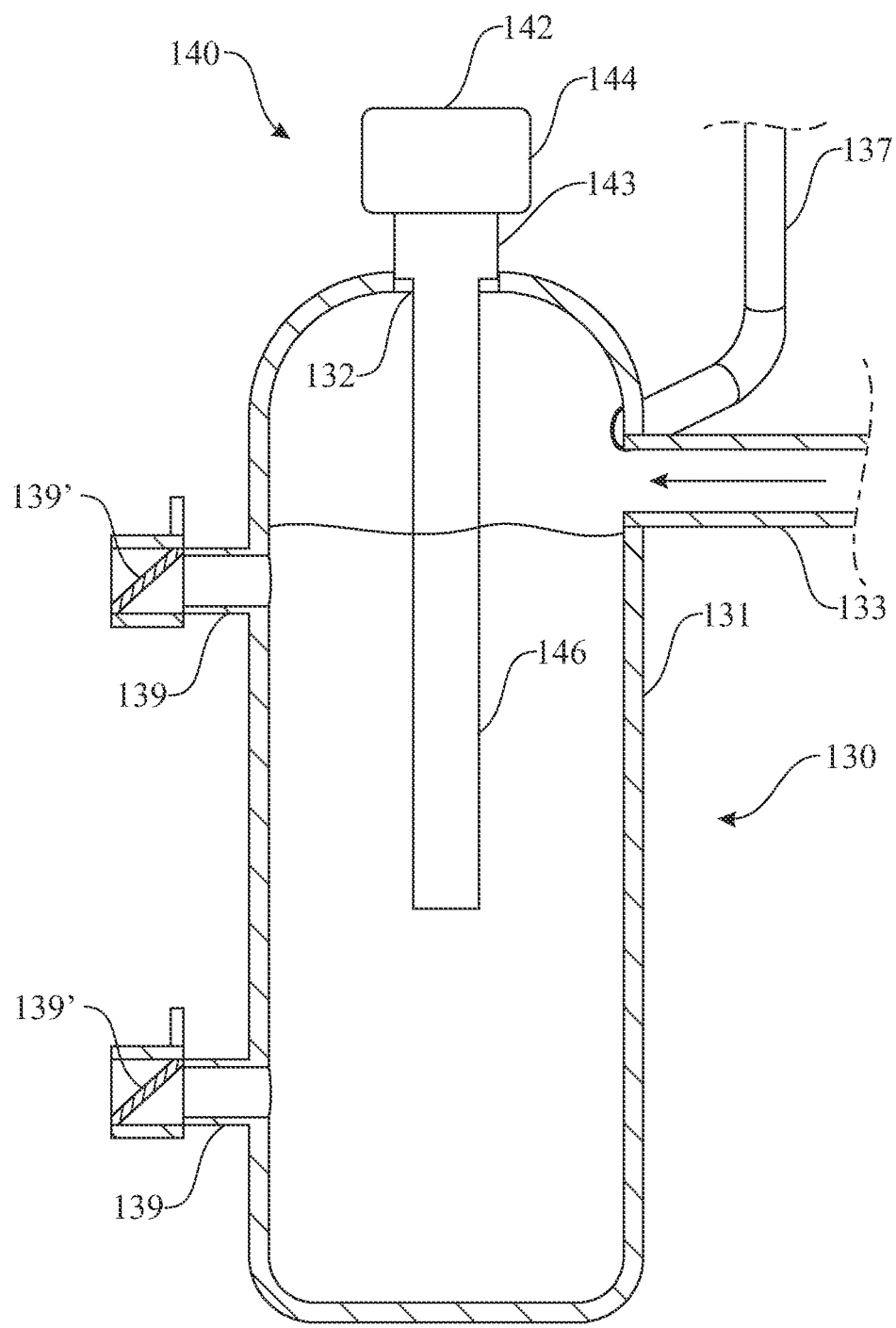
FIG. 6 presents a cross-sectional view of another illustrative embodiment of a reactor unit having a heater unit mounted therein, in accordance with the present invention.

A heater unit 142 in accordance with the present invention includes a heater mount 143 which is dimensioned and configured to seat in a heater mount aperture 132 of a reactor unit 131, as shown best in the illustrative embodiment of FIG. 6, which presents a cross-sectional view of a heater unit 142 operably mounted in a reactor unit 131. A heater unit 142 in at least one embodiment further comprises a heater tube 146 which is dimensioned and configured to extend into a reactor unit 131 and into direct contact with an amount of contaminated water contained therein. With reference once again to FIG. 6, a heater unit 142 in at least one embodiment further comprises a heater tube 146 having an elongated configuration which extends downwardly from a power head 144 of the heater unit 142 and well into the amount of contaminated water being processed in the reactor unit 131. As such, and once again as before, at least a heater tube 146 in accordance with the present invention is constructed of a material which is generally inert, non-reactive resistant to attack from a majority of common contaminants found in contaminated water. In at least one embodiment, a heater tube 145 of a heater unit 142 is at least partially made of an inert ceramic material of construction.

With continued reference to FIG. 6, a reactor unit 131 in accordance with at least one embodiment of the present invention includes upper and lower clean out ports 139, each having a corresponding clean out valve 139' operative therewith. It is to be appreciated that over time, an amount of residual contaminant(s) will build up in a reactor unit 131, at which point a high pressure water or steam injection line may be connected to an upper clean out port 139, the upper clean out port valve 139' is opened, and the inside of the reactor unit 131 may be cleaned as needed. After pressure and/or stream cleaning the inside of a rector unit 131, the cleaning water and/or residual condensate remaining in the reactor unit 131 may be removed via the lower close out port 139 by fitting a drain line thereon and opening the lower clean out port valve 139'. The cleaning water and/or residual condensate may be recycled back into a contaminated water storage tank 112, or otherwise disposed of properly and safely.

With reference once again to FIG. 1, in at least one embodiment, the present contaminated water purification system 100 further comprises a steam conversion assembly 150 disposed downstream of a reactor assembly 130. A steam conversion assembly 150 includes a steam conversion chamber 154 disposed in fluid communication with a steam discharge outlet manifold 128 which transfers an amount of purified steam generated in one or more reactor units 131 of a reactor assembly 130 in accordance with at least one embodiment of the present invention. More in particular, a steam conversion chamber 154 includes at least one cooling coil 155 operatively disposed therein, such that an amount of purified steam entering the steam conversion chamber 154 contacts the cooling coil 155 and is condensed into an amount of purified water.

Figure 7:
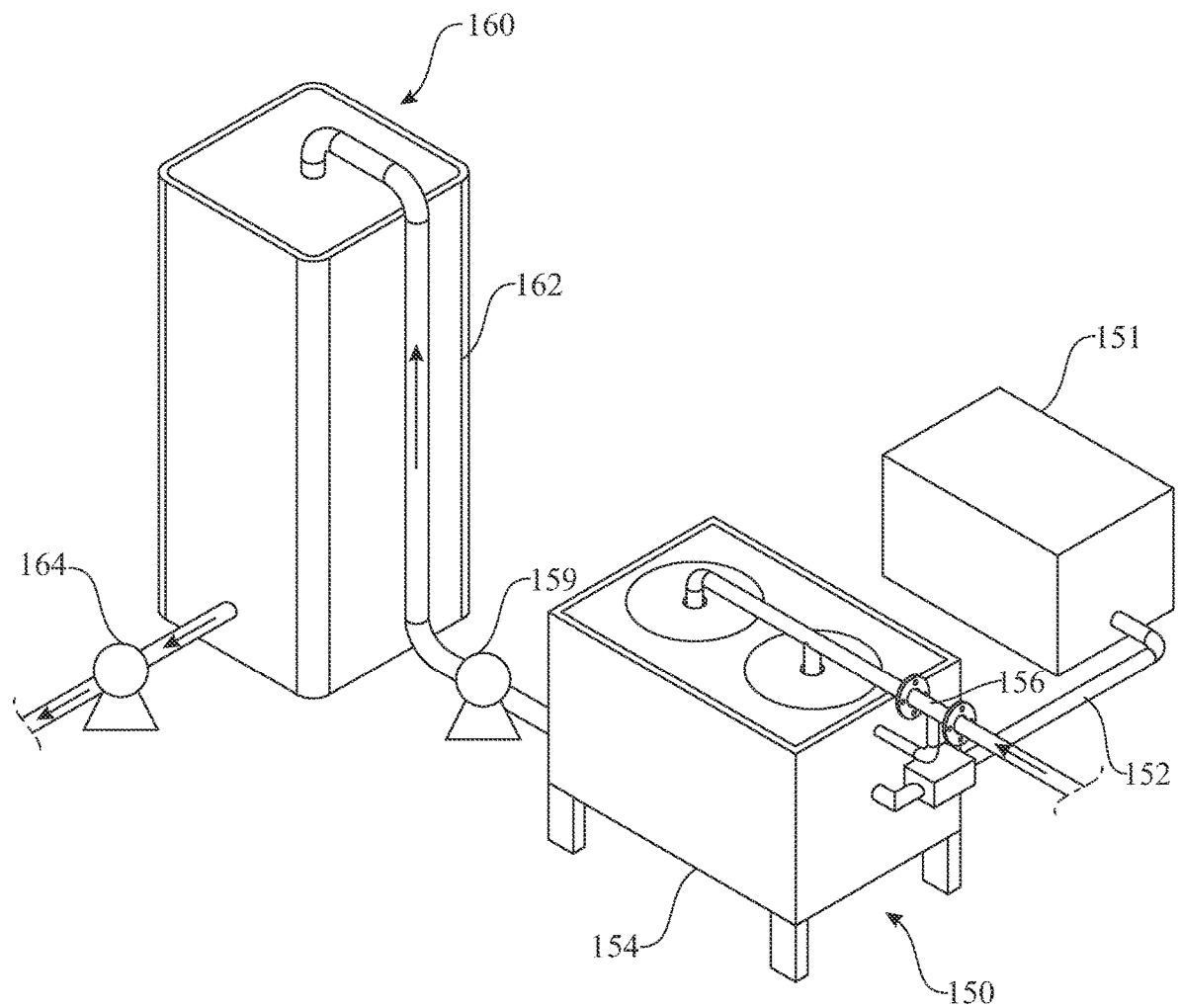
FIG. 7 presents a perspective view of one illustrative embodiment of a steam conversion assembly and a purified water storage assembly, in accordance with the present invention.

In at least one embodiment, a steam conversion assembly 150 includes a chiller unit 151 to generate an amount of a chiller fluid which is recirculated through the at least one cooling coil 155 to facilitate condensation of the purified steam coming into contact therewith in a steam conversion chamber 154. At least one chiller fluid circulation line 152 is provided to direct an amount of chiller fluid to at least one cooling coil 155. FIG. 7 presents a cross-sectional view of one illustrative embodiment of a steam conversion chamber 154 of a steam conversion assembly 150 in accordance with the present invention. As may be seen in FIG. 7, in at least one embodiment, a steam conversion chamber 154 includes a plurality of cooling coils 155 operatively disposed therein, each of the cooling coils 155 having a chiller fluid circulation line 152 disposed in fluid communication therewith to direct an amount of chiller fluid into and through each. In at least one embodiment, a chiller fluid return line (not shown) is provided to transfer the chiller fluid back to the chiller unit 151 after passing through one or more cooling coils 155 in a steam conversion chamber 154. The steam conversion assembly 150 further comprises one or more steam injection lines 157 which direct the amount of purified steam from a steam discharge outlet manifold 128 downward and into contact with at least one cooling coil 155 disposed inside of a steam conversion chamber 154, as before, to facilitate condensation of the purified steam therein.

Figure 8:
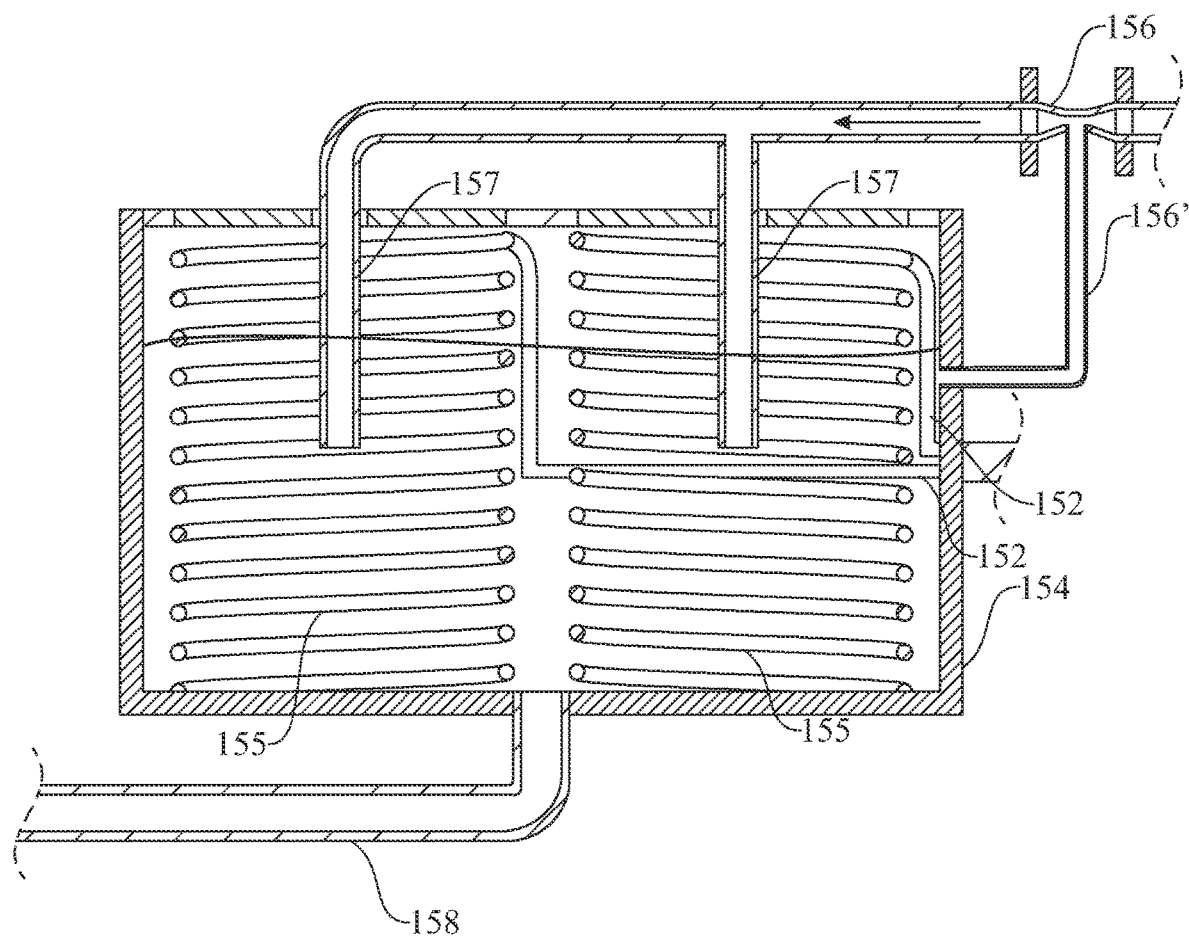
FIG. 8 presents a cross-sectional view of one illustrative embodiment of a steam conversion chamber, in accordance with the present invention.

In at least one embodiment, a steam conversion assembly 150 includes a steam jet ejector 156 disposed inline between a steam discharge outlet manifold 128 and a steam conversion chamber 154. With reference once again to FIG. 8, a steam jet ejector 156 comprises a throttled flow path therethrough which cause an induction of fluid from the stream conversion chamber 154 into the steam jet ejector 156, wherein the fluid mixes with the purified steam flowing therethrough, to further facilitate the condensation of the purified steam. A water induction line 156' is provided in at least one embodiment between the steam conversion chamber 154 and the steam jet ejector 156, such as shown by way of example in FIG. 8, to allow fluid to be drawn up from the steam conversion chamber 154 and into the steam jet ejector 156.

A contaminated water purification system 100 in accordance with at least one embodiment of the present invention further comprises a purified water storage assembly 160, such as is shown by way of example in FIG. 1. A purified water storage assembly 160 includes a purified water storage tank 162 which is dimensioned and configured to receive an amount of purified water produced by the condensation of an amount of purified steam in a steam conversion assembly 150. In one embodiment, a steam conversion chamber 154 includes a condensate transfer line 158, such as is shown by way of example in FIG. 7, to transfer an amount of purified water condensed in the steam conversion chamber 154 to a purified water storage tank 162. A condensate transfer pump 159 is provided in at least one embodiment to transfer an amount of purified water from the steam conversion chamber 154 to a purified water storage tank 162, such as is shown in the illustrative embodiment of FIG. 7. In one further embodiment, an amount of purified water condensed in the steam conversion chamber 154 is transferred to a purified water storage tank 162 via gravity flow, once again, by staging a purified water storage tank 162 at an elevation below a steam conversion chamber 154, in accordance with the present invention.

A purified water storage assembly 160 allows an amount of purified water to be stored until it is needed for use in the operation which produced the contained water treated in the present contaminated water purification system 100, or for discharge and further treatment via a municipal water treatment system, or other form of safe and proper disposal. A purified water storage assembly 160 in at least one embodiment includes a purified water transfer pump 164 in order to transfer the amount of purified water for further or final disposition. As before, in at least one embodiment, the purified water may be transferred from the purified water storage tank 162 via gravity flow by staging the purified water storage tank 162 at an elevation above the point of discharge for further or final disposition.

As disclosed above, in at least one embodiment, a control system (not shown) is provided to coordinate operation of the various components of a contaminated water purification system 100 in accordance with the present invention. As will be appreciated, a plurality of process sensors may be installed in the various operating units and interconnected fluid manifolds to measure process parameters including, but in no manner limited to, fluid level sensors, fluid temperature sensors, pressure sensors, flow sensors, etc. . . . just to name a few. In addition, a control system may employ a plurality of control valves disposed at strategic locations throughout the system including, but again not limited to contaminated water inlet control valves, vacuum line control valves, steam discharge outlet control valves, just to name a few. As will be appreciated, a computer controller of a control system can quickly compile and analyze a plurality of process data points and direct various control elements to activate, deactivate, and/or modulate their operational parameters to optimize purified steam generation in the plurality of reactor units 131 of a reactor assembly 130, such as, by way of example, controlling at least vacuum pump 124 and/or heater unit 142 operations, among others. Operation of various control valves may also be directed by a controller to allow the present contaminated water purification system 100 to operate in a continuous, batch, or semi-batch mode of operation.

Since many modifications, variations, and changes in detail can be made to the described preferred embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

What is claimed is:

1. A contaminated water purification system to purify an amount of contaminated water having an aqueous component and at least one contaminant component, said system comprising:
 a contaminated water storage assembly having a contaminated water storage tank to at least temporarily contain the amount of contaminated water prior to purification;
 a purification assembly having a contaminated water inlet manifold and a purified steam discharge manifold;
 a reactor assembly comprising at least one reactor unit disposed in fluid communication with said contaminated water inlet manifold, a portion of the amount of contaminated water is transferred from said contaminated water storage tank to said at least one reactor unit through said contaminated water inlet manifold;
 a heater assembly having at least one heater unit mounted in said at least one reactor unit disposed and configured to contact the portion of the amount of contaminated water therein, said at least one heater unit converts at least some of the aqueous component of the amount of contaminated water into an amount of purified steam;
 a steam conversion assembly comprising a steam conversion chamber, said purified steam discharge manifold disposed in fluid communication between said at least one reactor unit and said steam conversion chamber to transfer the amount of purified steam to said steam conversion chamber which condenses the amount of purified steam into an amount of purified water while the at least one contaminant component remains in said at least one reactor unit;
 a chiller unit disposed in communication with said steam conversion chamber, said chiller unit generating an amount of cooling fluid therein; and
 a purified water storage assembly having a purified water storage tank to hold the amount of purified water condensed from the amount of purified steam in said steam conversion chamber.

2. The system as recited in claim 1, wherein said reactor assembly comprises a plurality of reactor units.

3. The system as recited in claim 2, wherein each of said plurality of reactor units is disposed in fluid communication with said contaminated water inlet manifold and receives a portion of the amount of contaminated water from said contaminated water storage tank therethrough.

4. The system as recited in claim 2, wherein said heater assembly comprises a plurality of heater units.

5. The system as recited in claim 4, wherein each of said plurality of heater units is mounted in a different one of said plurality of reactors units and is disposed and configured to contact the portion of the amount of contaminated water received therein, each of said plurality of heater units converts the aqueous component of the portion of the amount of contaminated water into a corresponding amount of purified steam.

6. The system as recited in claim 5, wherein said purified steam discharge manifold is disposed in fluid communication between each of said plurality of reactor units and said steam conversion chamber to transfer the corresponding amount of purified steam from each of said plurality of reactor units to said steam conversion chamber.

7. The system as recited in claim 1, wherein said purification assembly further comprises a vacuum pump.

8. The system as recited in claim 7, wherein said purification assembly further comprises a vacuum manifold disposed in evacuating communication between said vacuum pump and said at least one reactor unit.

9. The system as recited in claim 8, wherein said vacuum pump creates a vacuum pressure in said at least one reactor unit of about 26 inches of mercury below atmospheric pressure to about 29 inches of mercury below atmospheric pressure, thereby depressing a boiling point of the aqueous component of the contaminated water contained therein to about 120 degrees Fahrenheit to about 80 degrees Fahrenheit.

10. The system as recited in claim 2, wherein said purification assembly further comprises a vacuum pump.

11. The system as recited in claim 10, wherein said purification assembly further comprises a vacuum manifold disposed in evacuating communication between said vacuum pump and each of said plurality of reactor units.

12. The system as recited in claim 11, wherein said vacuum pump creates a vacuum pressure in each of said plurality of reactor units of about 26 inches of mercury below atmospheric pressure to about 29 inches of mercury below atmospheric pressure, thereby depressing a boiling point of the aqueous component of the contaminated water contained therein to about 120 degrees Fahrenheit to about 80 degrees Fahrenheit.

13. The system as recited in claim 1, wherein said steam conversion chamber comprises at least one cooling coil disposed therein, said at least one cooling coil having a portion of the amount of cooling fluid from said chiller unit flowing therethrough, the amount of purified steam transferred to said steam conversion chamber contacts said at least one cooling coil and is condensed into the amount of purified water therein.

14. The system as recited in claim 1, wherein said steam conversion chamber comprises a plurality of cooling coils disposed therein, each of said plurality of cooling coils having a portion of the amount of cooling fluid from said chiller unit flowing therethrough, the amount of purified steam transferred to said steam conversion chamber contacts at least one of said plurality of cooling coils and is condensed into the amount of purified water therein.

15. The system as recited in claim 1, wherein said steam conversion assembly further comprises a steam jet ejector disposed between said purified steam discharge manifold and said steam conversion chamber, said steam jet ejector mixes a portion of the amount of purified water from said steam conversion chamber with the amount of purified steam passing therethrough to expedite conversion of the amount of purified steam into the amount of purified water.

16. The system as recited in claim 1, wherein said water purification assembly includes an upper clean out port of and a lower close out port coupled to said at least one reactor unit, where said upper clean out port is connected to a high pressure water or steam injection line to allow cleaning of an amount of residual contaminant within said at least one reactor unit; and where said lower close out port enables the amount of residual contaminant to be removed from said at least one reactor unit.

17. A contaminated water purification system to purify an amount of contaminated water having an aqueous component and at least one contaminant component, said system comprising:
 a contaminated water storage assembly having a contaminated water storage tank to at least temporarily contain the amount of contaminated water prior to purification;
 a purification assembly having a contaminated water inlet manifold and a purified steam discharge manifold;
 a reactor assembly comprising a plurality of reactor units each disposed in fluid communication with said contaminated water inlet manifold, a portion of the amount of contaminated water is transferred from said contaminated water storage tank to each of said plurality of reactor units through said contaminated water inlet manifold;

a heater assembly having a plurality of heater units each mounted in a different one of said plurality of reactor units and disposed and configured to contact the portion of the amount of contaminated water therein, each of said plurality of heater units converts at least some of the aqueous component of the corresponding amount of contaminated water into a corresponding amount of purified steam;

said purification assembly further comprises a vacuum pump and a vacuum manifold disposed in evacuating communication between said vacuum pump and each of said plurality of reactor units;

a steam conversion assembly comprising a steam conversion chamber, said purified steam discharge manifold disposed in fluid communication between each of said plurality of reactor units and said steam conversion chamber to transfer the amount of purified steam from each of said plurality of reactor units to said steam conversion chamber which condenses the amounts of purified steam into an amount of purified water while the at least one contaminant component remains in each of said plurality of reactor units;

a chiller unit disposed in communication with said steam conversion chamber, said chiller unit generating an amount of cooling fluid therein; and a purified water storage assembly having a purified water storage tank to hold the amount of purified water condensed from the amounts of purified steam in said steam conversion chamber.

18. The system as recited in claim 17, wherein said vacuum pump creates a negative pressure in each of said plurality of reactor units of about 26 inches of mercury below atmospheric pressure to about 29 inches of mercury below atmospheric pressure, thereby depressing a boiling point of the aqueous component of the contaminated water contained therein to about 120 degrees Fahrenheit to about 80 degrees Fahrenheit.

19. The system as recited in claim 17, wherein said steam conversion assembly further comprises a steam jet ejector disposed between said purified steam discharge manifold and said steam conversion chamber, said steam jet ejector mixing a portion of the amount of purified water from said steam conversion chamber to expedite conversion of the corresponding amounts of steam into the amount of purified water.

20. A contaminated water purification system to purify an amount of contaminated water having an aqueous component and one or more contaminant components, said system comprising:

a contaminated water storage assembly having a contaminated water storage tank to at least temporarily contain the amount of contaminated water prior to purification;

a purification assembly having a contaminated water inlet manifold and a purified steam discharge manifold;

a reactor assembly comprising a plurality of reactor units each disposed in fluid communication with said contaminated water inlet manifold, a portion of the amount of contaminated water is transferred from said contaminated water storage tank to each of said plurality of reactor units through said contaminated water inlet manifold;

a heater assembly having a plurality of heater units each mounted in a different one of said plurality of reactor units and disposed and configured to contact the portion of the amount of contaminated water therein, each of said plurality of heater units converts at least some of the aqueous component of the corresponding amount of contaminated water into a corresponding amount of purified steam;

said purification assembly further comprises a vacuum pump and a vacuum manifold disposed in evacuating communication between said vacuum pump and each of plurality of reactor units;

a steam conversion assembly comprising a steam conversion chamber comprising a plurality of cooling coils disposed therein, each of said plurality of cooling coils having an amount of a cooling fluid from a chiller unit flowing therethrough;

said purified steam discharge manifold disposed in fluid communication between each of said plurality of reactor units and said steam conversion chamber to transfer the amount of purified steam from each of said plurality of reactor units to said steam conversion chamber while the one or more contaminant components remain in each of said plurality of reactor units, the amounts of purified steam transferred to said steam conversion chamber contact at least one of said plurality of cooling coils condensing it into an amount of purified water therein; and a purified water storage assembly having a purified water storage tank to hold the amount of purified water condensed from the amounts of purified steam in said steam conversion chamber.

\* \* \* \* \*